Sept. 15, 1942.     H. A. REECE     2,295,604
APPARATUS FOR CONTROLLING THE FLOW OF AIR, GASES, AND THE LIKE
Filed Feb. 12, 1941     4 Sheets-Sheet 1
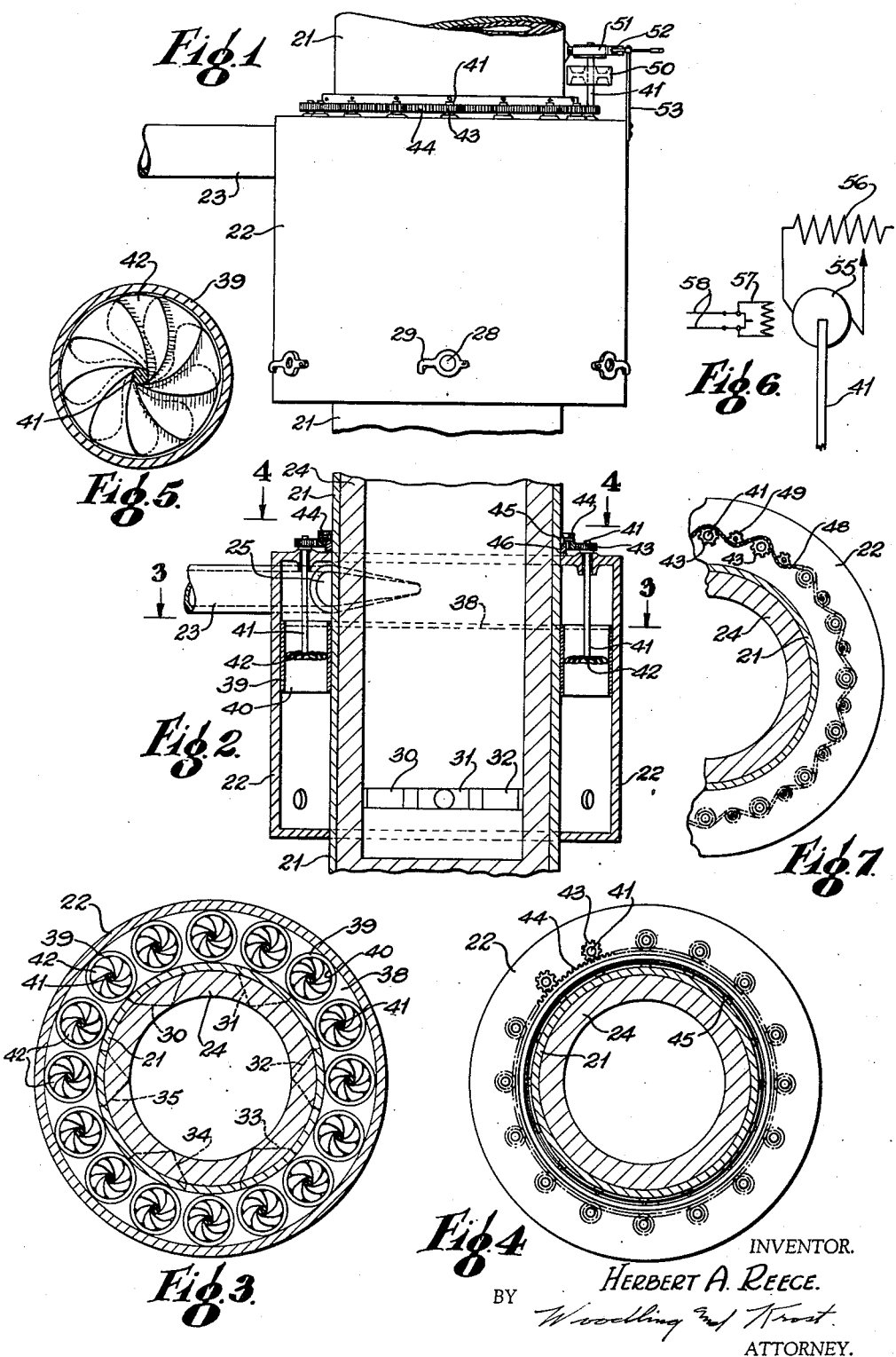
INVENTOR.
HERBERT A. REECE.
BY
ATTORNEY.

Sept. 15, 1942.   H. A. REECE   2,295,604
APPARATUS FOR CONTROLLING THE FLOW OF AIR, GASES, AND THE LIKE
Filed Feb. 12, 1941   4 Sheets-Sheet 2

INVENTOR.
HERBERT A. REECE.
BY
Wooddling and Krost.
ATTORNEY.

Sept. 15, 1942.    H. A. REECE    2,295,604
APPARATUS FOR CONTROLLING THE FLOW OF AIR, GASES, AND THE LIKE
Filed Feb. 12, 1941    4 Sheets-Sheet 3
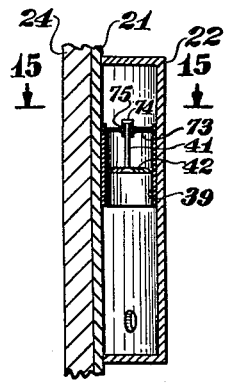
Fig.14.
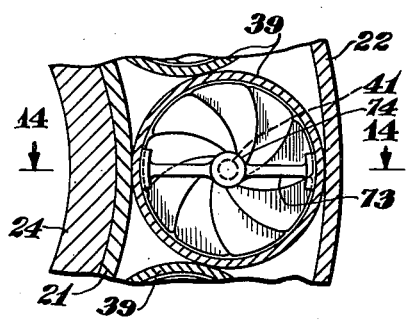
Fig.15.
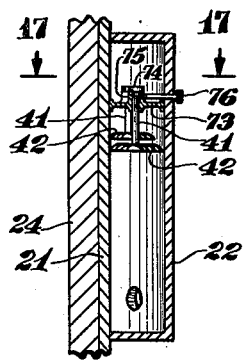
Fig.16.
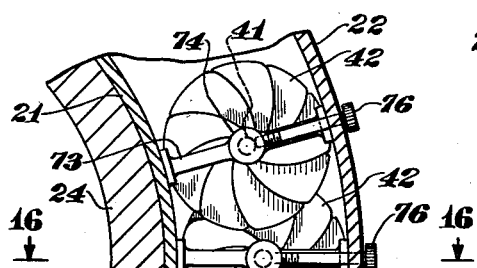
Fig.17.
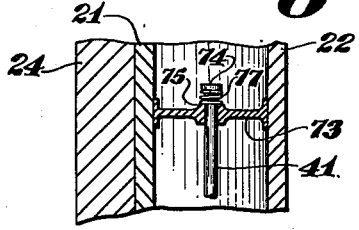
Fig.18.
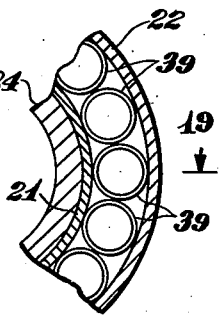
Fig.19.
Fig.20.
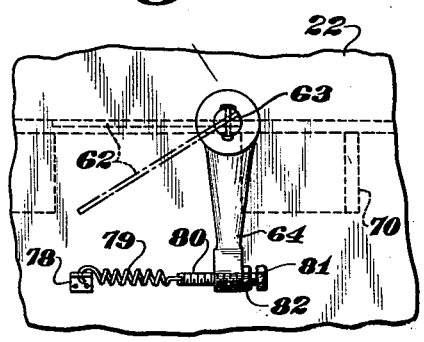
Fig.21.
INVENTOR.
HERBERT A. REECE.
BY
ATTORNEYS Sept. 15, 1942.    H. A. REECE    2,295,604
APPARATUS FOR CONTROLLING THE FLOW OF AIR, GASES, AND THE LIKE
Filed Feb. 12, 1941    4 Sheets-Sheet 4

INVENTOR.
HERBERT A. REECE.
BY
Woodling & Krost.
ATTORNEYS.

Patented Sept. 15, 1942

2,295,604

UNITED STATES PATENT OFFICE 2,295,604

APPARATUS FOR CONTROLLING THE FLOW OF AIR, GASES, AND THE LIKE

Herbert A. Reece, Cleveland Heights, Ohio, assignor to Meehanite Metal Corporation, a corporation of Tennessee Application February 12, 1941, Serial No. 378,680

33 Claims. (Cl. 266—30)

My invention relates to supply apparatus for delivery of air and the like, such as wind boxes for metallurgical furnaces, and to the operation of the same.

The present patent application is a continuation-in-part of my copending patent application Serial No. 330,878, filed April 22, 1940.

My present invention, herein described, is related in subject matter to my invention described in my United States Letters Patent No. 2,197,947, issued on April 23, 1940, and is directed to the same and similar problems of furnace operation and control of air flow as is set forth in said patent and to other problems of furnace operation.

In the following discussion and description the operation and structure of a cupola for the remelting of metal will be referred to but it is to be understood that my invention includes the structure and operation of all furnaces or similar devices wherein a blast of air or other gases is supplied through a plurality of tuyères or like openings to the interior of the furnace or similar device.

It is an object of my invention to provide a wind box for supplying an air blast at substantially equal velocities to each of a plurality of tuyères.

A further object is the provision of improved apparatus for supplying an air blast to each of several tuyères at desired velocities without disturbing the relative volume of air supplied to each of the several tuyères.

Another object is the control of the air blast delivered to a plurality of tuyères of a furnace from a wind box.

Another object is the modification of the current of air blast moving through a wind box.

Another object is the modification of the direction of portions of an air blast passing through a wind box from an inlet to a plurality of outlets.

Another object is the provision of apparatus and method of modifying a flow of air through a common distributing chamber.

Another object is the provision of a device for improving the control of the air blast to a furnace.

Another object is the provision for the control of the melting zone of a furnace.

Another object is the provision of yieldable resistance to the flow of air through a common distributing chamber to control the velocity of the air flowing from the chamber to a plurality of outlets.

Another object is the provision for modification of the velocity of an air blast by a resistance to the air blast which yields to the force of the air blast.

Another object is the provision for equalizing the flow of air through a common distributing chamber by resisting members movable by the flow of air.

Another object is the provision for counterbalancing a resistance to air flow with a yielding to the air flow in a manner to equalize the velocity of the air flow in different localities of a wind box to supply the air to the outlets of the wind box at uniform velocity.

Another object is the provision of improved apparatus for flexible control of the flow of air to a plurality of tuyères in order to meet varying conditions and requirements.

Another object is the provision for adjustment of the modification of the flow of air to a plurality of tuyères in accordance with conditions and requirements.

Another object is the provision for supplying air to a plurality of tuyères at velocities and in amounts in accordance with conditions and requirements.

Another object is the provision for maintaining a flow of air of uniform velocity at a predetermined or desired rate to a plurality of tuyères.

Another object is the provision of a method for improved operation of a furnace and the supplying of air thereto.

Another object is the provision of apparatus for the carrying out of the foregoing objects.

Another object is the provision of an improved method for the attainment of the stated desired result.

Other objects and a fuller understanding of my invention may be had by referring to the following description and claims, taken in conjunction with the accompanying drawings, in which:

Figure 1 is an elevational view of a wind box mounted upon a cupola;

Figure 2 is a cross-sectional view taken lengthwise of the cupola and wind box shown in Figure 1;

Figure 3 is a transverse cross-sectional view taken through the line 3—3 of Figure 2;

Figure 4 is a transverse cross-sectional view of the cupola taken through the line 4—4 of Figure 2;

Figure 5 is an enlarged detailed view of the revolvable vanes mounted within the wind box as shown in Figures 2 and 3;

Figure 6 illustrates a modified form of the retarding and stabilizing mechanism which may be used in conjunction with the revolvable vanes;

Figure 7 illustrates a modified form of means for connecting together the revolvable vanes to operate in unison;

Figure 14 illustrates a form of my invention in which there is no operating connection between the plurality of revolvable vanes such as those shown in Figure 2, and is a view taken along the line 14—14 of Figure 15;

Figure 15 is a cross-sectional view taken through the line of the arrows 15—15 of Figure 14;

Figure 11:
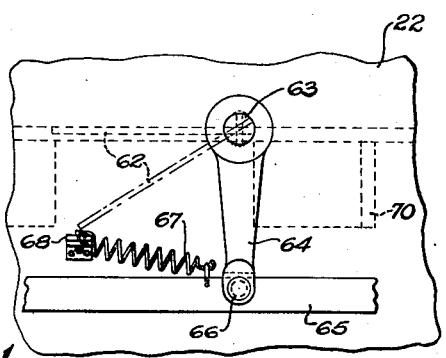
Figure 11 is a detailed view in enlarged form illustrating the mechanism for connecting the louvers to operate in unison.
Figure 22:
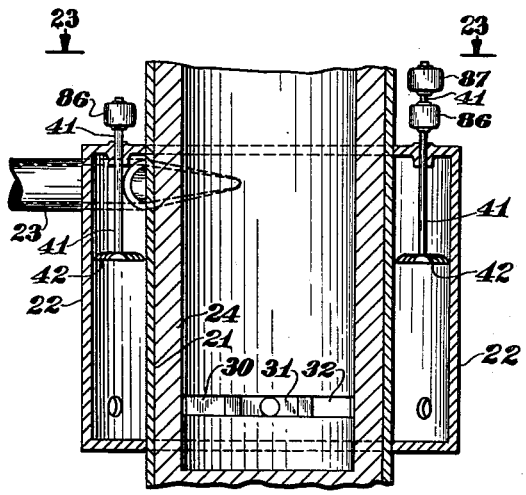
Figure 23:
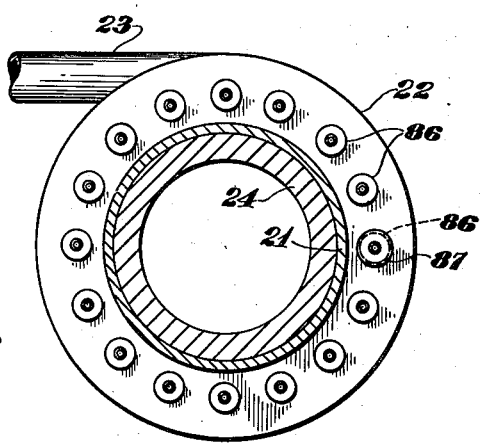
Figure 24:
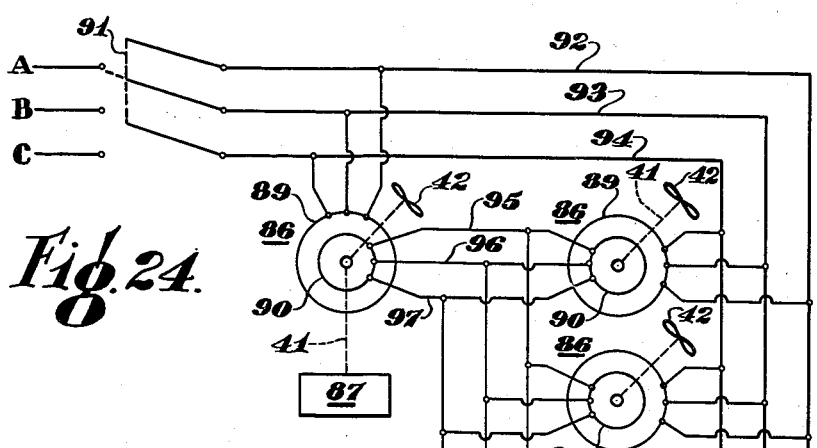
Figure 25:
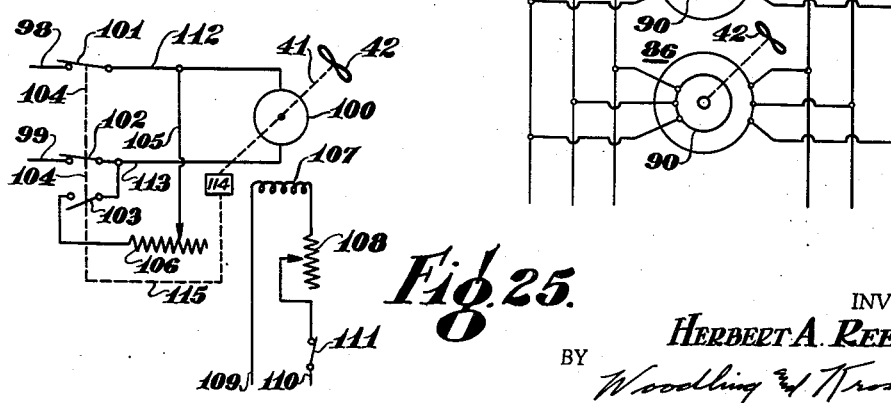

Figure 16 is a view taken along the line 16—16 of Figure 17 and illustrates a form of my invention in which there are no conduits surrounding the vane members and no horizontal partition extending between the conduits as in the form shown in Figures 2 and 3, and also in which the vane members are arranged in over-lapped or staggered relationship in respect to each other, the revolving of each vane member being independently controlled by a set-screw bolt;

Figure 17 is a cross-sectional view taken through the line of the arrows 17—17 of Figure 16;

Figure 18 illustrates a modified mounting of a vane member arranged to provide a frictional resistance to the revolving of the vane members in proportion to the force of the air blast against said vane member;

Figure 19 is a view taken through the line 19—19 of Figure 20 and illustrates an apparatus embodying features of my invention in which the revolvable vane members in the conduits and the horizontal partition between the conduits, as shown in Figures 2 and 3, are omitted;

Figure 20 is a cross-sectional view taken through the line of the arrows 20—20 of Figure 19;

Figure 21 is a view somewhat similar to that of Figure 11 but in which there is no interconnecting means between the several louvers;

Figure 22 illustrates a modified form of my invention in which a dynamo-electric machine is mounted upon the shaft of each of the several revolvable vane members for controlling and influencing the supplying of air to the tuyères;

Figure 23 is a plan view looking in the direction of the arrows 23—23 of Figure 22;

Figure 24 is a diagram of the electrical circuit which may be utilized for the dynamo-electric machines of Figures 22 and 23 to connect the same in synchrony; and Figure 25 is a diagram of the electrical circuit which may be utilized for each dynamo-electric machine of Figures 22 and 23 to operate each machine independently of the others.

Inasmuch as the invention disclosed herein is directed to the wind box and the portion of the cupola adjacent thereto it has not been considered necessary to show all parts of the cupola and therefore the drawings do not include the top portion and the bottom portion of the cupola, which portions may be considered as having the usual form. Also, for purposes of simplicity in illustration, the usual tap hole and slag hole are not shown. It has also been considered unnecessary to illustrate such other openings as a clean-out door, breast arch, or drop-bottom doors. The cupola with which the invention is associated and which is described herein may be considered, however, as having all of the parts necessary for the usual operation of the same.

As shown in the several views of the drawings the cupola body or shell 21 is in the form of a cylindrical shaft, the inner walls of the cupola body 21 being lined by the fire brick lining 24. The body 21 and the lining 24 are mounted upon the usual bottom plate and thereby forming the enclosed shaft of the cupola.

A wind box 22 of cylindrical shape is mounted upon the cupola body 21 by welding or other suitable means and in the embodiment shown, the outer wall of the cupola body forms one of the enclosing walls of the wind box 22. It is therefore seen from the views of the drawing that the wind box 22 forms an enclosed jacket surrounding the cupola body 21 in such a way that air introduced into the wind box may circulate entirely around the cupola body.

The inlet conduit 23 is in communication with the air blower or other source of an air blast (not shown) and the inlet conduit 23 is connected to the wind box 22 at the upper portion of the wind box 22 so as to afford communication between the air blower and the inlet opening 25 of the wind box 22.

Figure 8:
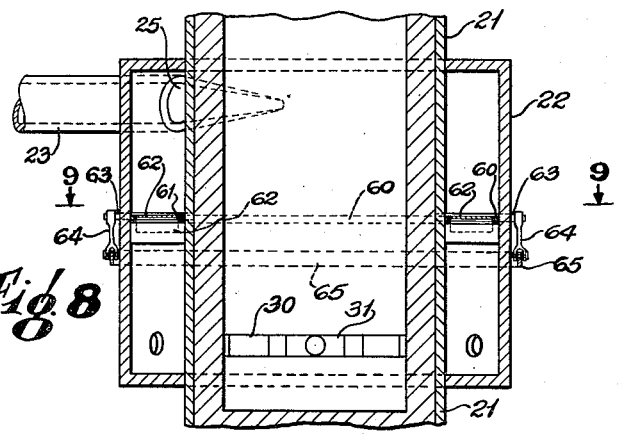
Figure 8 is another cross-sectional view taken lengthwise of the wind box in which a modified form of control apparatus is mounted, horizontal vanes of the louver type being utilized instead of the revolvable vanes.

In the cupola illustrated there are six tuyères extending through the wall and lining of the cupola body 21 to establish communication between the interior of the shaft of the cupola and the wind box 22. Tuyères 30, 31 and 32 as seen from the inside of the shaft of the cupola are illustrated in Figures 2 and 8. All six tuyères, 30, 31, 32, 33, 34 and 35 are shown in dotted lines in Figures 3, 9 and 10. The tuyères are of substantially equal size and are uniformly spaced around the periphery of the cupola. It is to be noted that the tuyères enter the cupola body at a low level in the cupola and communicate with the wind box in a lower portion thereof. In order that the operator may look into the tuyères from the outside of the furnace, peep holes are provided in the wind box opposite each of the tuyères and mica or other suitable substance is sealed over these peep holes. Except when necessary, peep hole covers 28 hingedly connected to the wind box 22 are kept in position over the peep holes by means of the latch members 29.

The description of the first form of the invention for controlling the velocity of the air blast delivered to the plurality of tuyères is made in conjunction with the showing of Figures 1 to 7, inclusive. With reference to said figures there is shown positioned within the wind box below, and at a distance from, the inlet opening 25 a partition or plate 38 disposed horizontally of the wind box and encircling the cupola body. The partition 38 is secured to the walls of the wind box 22 and the cupola body 21 by welding or other suitable means. The partition 38 extends transversely of the wind box in the path of the flow of air from the inlet opening 25 to the tuyères 30, 31, 32, 33, 34 and 35.

The horizontal partition 38 has a plurality of openings 40 distributed at regular intervals around the extent of the partition. Extending through the openings 40 are the vertically disposed tubular conduits 39 which extend downwardly from the plane of the partition 38. In this manner the wind box 22 is divided in two portions by the partition 38 and air within the upper portion adjacent the inlet must travel through the conduits 39 to reach the lower portion of the wind box adjacent the tuyères. Inasmuch as the tubular conduits are vertically disposed, air moving through the wind box from the upper portion to the lower portion must travel in a substantially vertical direction in passing through the partition. Figure 3 illustrates the regularity of the arrangement of the conduits 39 in the partition 38.

The arrangement of the wind box, the inlet, and the outlets to the tuyères is such that without my control apparatus currents of air of unequal velocity circulate around the wind box and tend to flow tangentially of the entrances of the tuyères. Without adequate control of the velocity of the air moving through the wind box the air is supplied to the tuyères at unequal velocities. By the control of the flow of air through the wind box in the manner here described the velocity of the air is modified to provide a supply of air to the plurality of tuyères at substantially equal velocity. The circulatory and tangential flow of the air is transformed into a vertical flow of uniform density and equal velocity to the tuyère entrances.

To control the flow of air through the conduits 39, there are positioned within each of the conduits, intermediate of its ends, tilted vanes 42 which overlap each other with intervening spaces therebetween. The vanes 42 are formed in a manner similar to that of an electric fan having tilted vanes or blades which overlap each other. The vanes 42 are mounted upon and rigidly secured to vertical shafts 41 which extend vertically downward into the conduits 39. The vanes 42 are disposed to extend substantially across the inner opening 40 of the conduits 39 in the path of the flow of air through the conduits. The force of the air flowing through the conduits in meeting the tilted vanes causes the vanes to revolve and to thereby rotate the shafts 41 upon which the vanes are mounted. Inasmuch as the separate vanes or blades are separated from each other by intervening spaces air may pass through the conduits 39 past the vanes 42 just as air may pass through the blades of a fan. The faster the flow of air through the conduits 39 the faster the vanes or blades 42 revolve and the faster the shafts 41 rotate. In portions of the wind box wherein the rate of the flow of air is greater than in other portions of the wind box the vanes 42 tend to revolve faster at that location.

Likewise, the faster the vanes or blades 42 may be revolved by rotating the shafts 41 the faster the flow of air through the conduits 39. When driven by external force the vanes or blades 42 impel the air through the conduits and therefore the vanes or blades are impellers when externally driven at a faster rate than the rate of flow of air through the wind box as supplied from the inlet. In the first phase of my invention the vanes or blades 42 are primarily moved by the force of the flow of air through the conduits and in another phase of my invention the vanes or blades are primarily moved by external force applied to the shafts and thus forcibly advance the air flow. In intermediate phases both the external force applied to the shafts and the force of the air blast against the vanes or blades may be at work, sometimes with one force predominating and other times with the other force predominating, although the physical apparatus may remain the same during changes in the balance of energy applied.

The vanes or blades 42 being positioned in the path of the flow of air through the conduits resists the flow of air. The vanes being tilted, however, and having intervening spaces between the separate vanes or blades yields to the force of the air blast and in doing so revolve and rotate the shafts upon which the vanes are mounted. The vanes thereby constitute resistors to the flow of the air blast and are instrumental in modifying the velocity of the air blast. By the arrangement of the vanes, however, to revolve under the force of the air blast the resistance offered by the vanes yields to the force of the air flowing through the conduits. The vanes yield or give way to the force of the air blast in proportion to the velocity of the flow of air and result in a revolving of the vanes at a rate in proportion to the rate of the flow of air through the respective conduits in which the vanes are mounted. In conduits in which the velocity of the air blast is in excess of the flow of air through other conduits the vanes in the conduit in which the flow of air is excessive tend to revolve at a more rapid rate of speed in comparison with the rate of speed of the vanes in the other conduits. Therefore, the tilted vanes 42 tend to revolve in proportion to the velocity of the air blast at the locality of the wind box in which the particular vanes are mounted.

To synchronize the revolutions of the vanes 42 and to assure their movements in unison the shafts extending from the respective vanes are operatively connected together outside of the wind box 22 by means of a ring gear 44. Each shaft 41 extends through the upper wall of the wind box 22 in such a manner that it is journalled upon a bearing provided in the wall of the wind box. There is a hermetic seal between the shaft 41 and the bearing to prevent the escape of air out through the wall of the wind box. A gear 43 is non-rotatably secured to the upper end of each of the plurality of shafts 41 and rotates with the shaft 41. The teeth of the gears 43 are enmeshed with the ring gear 44 which circles around the cupola body and engages each of the gears 43. The rolling bearing portions 45 extending from the inner periphery of the gear 44 are supported upon, and rotatively engage, the annular support 46. Rotation of the gears 43 causes the ring gear 44 to revolve around the cupola body. In this manner all of the shafts 41 are operatively connected together to assure the rotation of all of the shafts at the same speed. The ring gear 44 and inter-meshing gears 43 provide for the transmission of the movement or revolution of the vanes in one conduit to the vanes in all other conduits extending through the partition. Upon the revolution of the vanes in one conduit at a relatively fast speed by reason of the high velocity of the air flow therethrough the connecting means tying in together all of the shafts 41 causes all of the vanes throughout the wind box to revolve at the same speed.

A slight modification of the connecting means between the several shafts is illustrated in Figure 7 in which a sprocket chain 48 inter-connects all of the gears 43, the chain being maintained in enmeshing engagement with the gears by means of the rollers 49.

To provide further control over the flow of air through the several conduits there is provided a stabilizing action by mounting a fly-wheel 50 upon one of the shafts 41 which extends upwardly beyond the other shafts. Either one of the shafts 41 upon which the vanes are mounted may be utilized or a separate shaft geared to rotate with the ring gear 44 may be utilized. The revolving of the fly-wheel 50 tends to maintain the constant speed of the vanes 42 throughout pulsations or fluctuations of the total air blast entering the wind box through the inlet conduit 23. The stabilizing effect of the fly-wheel 50 in operative connection with the revolving parts assists in maintaining the flow of air to the tuyères at a constant rate even though there may be minor fluctuations or pulsations in the total air blast delivered to the wind box.

The fraction of the moving parts affords a certain retarding action to the apparatus and prevents the revolving of the blades in all of the conduits at the rate of speed of the air in the conduits where the velocity of the air blast is the greatest. A retarding action to the revolution of the vanes over and above the inherent retarding action afforded by the friction of the parts is provided by the brake drum 51 mounted upon the upper end of one of the shafts 41. An adjustable tension device 52 carried by a support 53 engages the drum 51 to retard the rotation of the shafts 41. By adjusting the tension device 52 the desired retarding action to the revolution of all of the vanes may be obtained. The retarding device may be mounted upon the same elongated shaft 41 as is the fly-wheel 50 or may be otherwise operatively connected to the moving parts to retard the action of all of the revolving vanes as may be desired. The adjustable amount of friction effected by the tension device 52 on the brake drum 51 provides a "drag" upon the movement of the rotating and revolving parts.

In Figure 6 there is shown a modified form of mechanism for stabilizing the rotation of the shafts 41 and for adjustably retarding the movement of the parts as desired. The armature 55 of a dynamo-electric machine is mounted upon the end of the shaft 41 and the weight of the armature 55 acts as a stabilizer in the same manner as the fly-wheel 50 shown in Figure 1. The field winding 57 is connected by the leads 58 to a source of electrical energy. An adjustable resistance winding 56 is connected in circuit with the armature winding. By adjustment of the resistance circuit 56 a desired retarding action may be obtained by the imposing of a "drag" upon the rotation of the armature 55. A delicate adjustment of the retarding action desired may be obtained by the use of the dynamo-electric machine mounted as illustrated in Figure 6. The Patent Office symbols have been utilized to illustrate the modification of the stabilizing and retarding mechanism of Figure 6.

The dynamo-electric machine mounted on the shaft 41 in Figure 6 is both a generator and a motor. It is a generator when the mechanical energy supplied to it by the shaft 41 (rotated by the vanes or blades under force of the air blast) is in excess of the electrical energy supplied to the dynamo-electric machine. It is a motor when the electrical energy supplied to it is in excess of the mechanical energy, if any, supplied to the shaft. The direction of the flow of energy determines whether the dynamo-electric machine acts as a motor or generator. In both cases the revolving of the vane or blades is responsive to, and governed by, the operation of the dynamo-electric machine. The armature of the dynamo-electric machine in both instances acts as a stabilizer of the revolving of the vanes or blades. The dynamo-electric machine, whether functioning as a motor or a generator, is a controller governing the operation of the vanes or blades in the respective conduits.

In cases in which the blower delivering air through the inlet 25 of the wind box fails to supply the air at the desired minimum rate of flow or fails to deliver a blast of air at all or in cases in which a blower is omitted, then the dynamo-electric machine, being set at a pre-determined speed (by adjusting the adjustable resistance winding 56 that is in circuit with the armature winding), will drive the shafts 41 and revolve the vanes or blades 42 at a speed necessary to maintain a flow of air through the conduits 39 at the minimum rate required. Therefore, the revolving of the vanes is responsive to, and in accordance with, the operation of the dynamo-electric machine just as is the operation of the dynamo-electric machine responsive to, and in accordance with, the revolving of the vanes.

By means of the yieldable resistance of the vanes 42 to the flow of air the velocity of the air flow is modified and is brought into equilibrium in all locations throughout the cross-sectional area of the wind box. The connecting means tying in together all of the revolving vanes assists in the distribution of the air flow to equalize the velocity of all portions of the air flow passing from the upper portion of the wind box to the lower portion. By the use of the described apparatus air is supplied to the plurality of tuyères opening into the lower portion of the wind box at substantially equal velocities.

Figure 9:
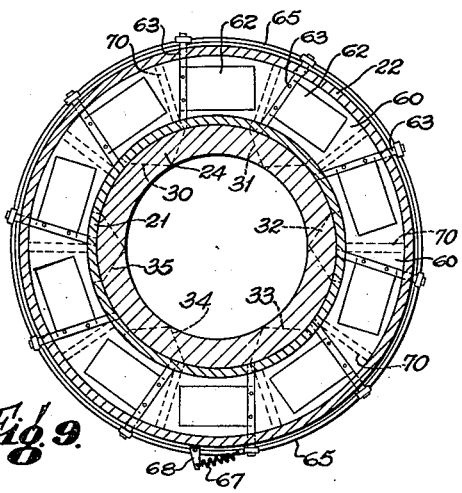
Figure 9 is a transverse cross-sectional view of the wind box shown in Figure 8 and taken through the line 9—9 thereof, and illustrates the louvers in one position.
Figure 10:
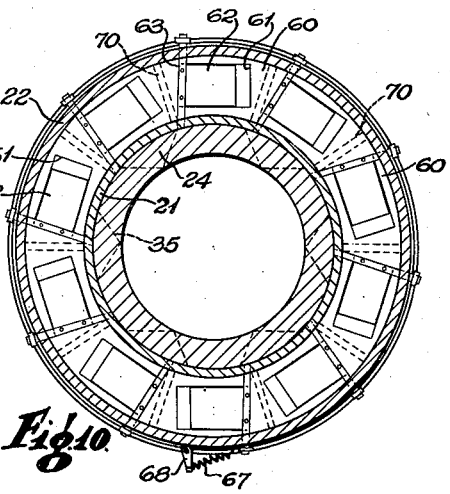
Figure 10 is a view similar to that of Figure 9 and illustrates the louvers in another position, the louvers in Figure 9 being closed and the louvers in Figure 10 being open.

In Figures 8, 9 and 10 there is shown a modified form of apparatus for controlling the velocity of air moving through a wind box. The horizontal partition 60 is mounted within the wind box and transversely thereof in the path of the flow of air moving from the inlet 25 to the plurality of tuyères. The disposition of the partition 60 is such that the wind box is divided into an upper portion adjacent the inlet and a lower portion adjacent the entrances to the tuyères. A plurality of uniformly sized rectangular openings 61 are provided in the partition 60 and are spaced at regular intervals around the extent of the partition 60 encircling the cupola body. A plurality of doors or louvers 62 of substantially the same size as the openings 61 are pivotally mounted by means of the shafts 63 in the plane of the partition 60. Upon the disposition of the louvers 62 in a horizontal position the openings 61 are closed by the louvers respectively. The louvers 62 are adapted to be moved downwardly by the force of the air blast and to tilt out of the plane of the partition 60. One edge of each louver is mounted on a horizontal shaft 63 in a manner that the shaft 63 provides a hinge for the louver 62. Upon the tilting of the louvers downwardly by the force of the air blast moving down through the wind box the horizontal shafts 63 are rotated thereby.

Each shaft 63 is journalled to the wall 21 of the cupola and extends out through openings provided in the wall 20 of the wind box 22, there being a hermetic seal between the shafts 63 and the wind box 22 to prevent the escape of air from the wind box.

A crank arm 64 is non-rotatively secured to the outer end of each shaft 63, the rotation of each shaft 63 swinging the crank arm 64 secured thereto in an arc.

Figure 12:
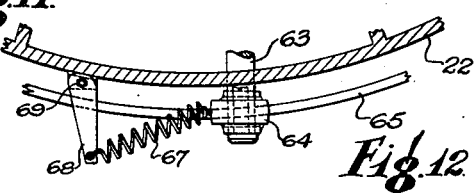
Figure 12 is a plan view of the structure shown in Figure 11.

To provide an operative connection between all of the shafts 63 and respective crank arms 64, a ring 65 is mounted around the wind box 22 and disposed in a horizontal plane. The detail of the connection between the crank arm 64 and the ring 65 is illustrated in the enlarged views of Figures 11 and 12. It is seen from these views that the swinging of the arm 64 moves the ring 65 accordingly. In the view of Figure 11 the swinging of the arm 64 moves the ring 65 to the right or to the left, as the case may be, and slightly raises the ring. By reason of the fact that the ring 65 is annular and not straight there is a slight compound movement between the arm 64 and the ring 65 and for this reason the swivel connection 66 has sufficient clearance at the bearing surface to give the effect of a ball and socket connection. To urge the louvers 62 into a closed position and to yieldably resist the force of the air blast through the openings 61 a spring 67 is provided to urge the ring 65 in one direction, that is, the direction to close the openings 61 by the louvers 62. The tension of the spring 67 may be adjusted by shifting the position of the anchor arm 68 to which the outer end of the spring is secured. By means of the adjusting nut 69 the arm 68 may be fixed at various angular positions and the tension of the spring 67 thereby adjusted to need.

Vertical guide plates 70 extend downwardly from the partition 60 intermediate of the rectangular openings 61 and assist in guiding the air through the partition vertically toward the tuyère entrances. The vertical guide plates 70 extend across the wind box between the wall of the cupola body and the outer wall of the wind box.

By the structure and arrangement described the louvers act as resistors to the flow of air through the wind box and at the same time yield or give way to the force of the air blast moving through the wind box from the upper portion to the lower portion thereof. The ring 65 operatively connects all of the louvers together to assure their simultaneous operation in a uniform degree. Upon the air blast forcing one of the louvers open all of the louvers are opened in unison and all are opened in the same amount. By reason of the friction of the parts there is an inherent "drag" upon the movement of the louvers in response to the force of the air blast. In addition to the retarding action inherent in the apparatus the tension of the spring 67 affords a retarding action upon the movement of the louvers or horizontal vanes in the degree desired by the adjustment of the tension of the spring.

In portions of the wind box where the velocity of the air blast is excessive there is a tendency for the opening at that locality to permit the excess air to flow therethrough. However, the resistance of the louver at that locality to the air flow overcomes the excessive amount of air flow there and causes the excess to move through the partition at another opening where the flow is not excessive. The opening by the louvers in unison distributes the flow of air uniformly around the wind box and provides such a uniform resistance to excessive flow of air in one locality that the velocity of the air flow is equalized. The resistance to the air flow is yieldable in proportion to the total force of the air blast and thereby avoids the danger of excessive back pressure. However, the yielding or giving way of the resistance being uniform at all points around the wind box, an equal distribution of air flow is obtained.

Figure 13:
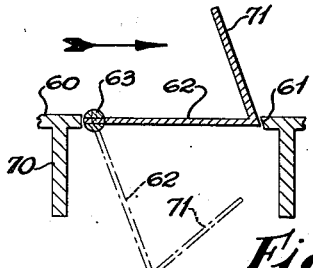
Figure 13 illustrates a modified form of louver which may be incorporated in the control apparatus.

In Figure 13 there is illustrated a modified form of louver having an angularly disposed portion 71 extending upwardly therefrom. In the use of this form of louver the tangential flow of air circulating around in the upper portion of the wind box is indicated as having the direction of the arrow of Figure 13. Air flowing tangentially of the wind box, that is, substantially parallel to the partition 60 engages the angular portion 71 and tends to keep the louver 62 in a closed position and thereby preventing the tangential flow from being carried on into the lower portion of the wind box below the partition 60. A downward flow of air, however, presses upon the louver 62 and tends to open the opening 61 and permitting the air blast to move downwardly in the wind box. The arrangement of the form illustrated in Figure 13 provides for a balance between the force of the tangential flow of air and the downward flow of air. Inasmuch as it is desired to eliminate tangential flow of air in the wind box and to supply the air to the tuyères by a downwardly moving body of air the modified form illustrated in Figure 13 affords a much desired result. Only the modified form of the louvers having the angularly disposed portions 71 is illustrated in Figure 13 but it is to be understood that the louver there illustrated may be substituted for the flat rectangular louver shown in Figures 8, 9 and 10, and may be interconnected with the other louvers in the same manner as described.

In order to illustrate the position of the horizontally disposed louvers in two possible positions both the views of Figures 9 and 10 are shown. In Figure 9 the louvers are disposed in the same plane as the partition 60 and close the openings 61. This would be the normal position of the louvers in the absence of the force of the air blast tilting them downwardly. In Figure 10 a similar view is shown in which the louvers 62 are tilted downwardly by the force of the air blast to provide uniformly distributed openings at regularly spaced intervals around the extent of the partition. In this position the louvers 62 are still resisting the force of the air blast but have yielded thereto in proportion to the force of the air blast. The connecting means operatively connecting all of the louvers together provides that the resistance and the yielding of the resistance is uniform throughout the cross-sectional area of the wind box.

My invention also includes the disclosed apparatus without any mechanical connecting means between the revolving vanes in the form illustrated in Figures 8 to 13 for the assurance of uniform operation of the same. For example, my invented apparatus includes the combination of parts which omits the ring gear 44 of Figures 1, 2 and 4, omits the sprocket chain 48 of Figure 7, and omits the connecting ring 65 of Figures 8, 9, 10, 11 and 12.

In Figures 14 and 15 there is illustrated apparatus omitting such interconnecting means between the shafts 41 of the revolvable vane members 42. In the apparatus illustrated in Figures 14 and 15 each shaft 41 is supported in position by a bracket 73 extending across the top of each conduit 39, the bracket being secured in position by welding or other suitable means. The bracket 73 has an apertured central portion 75 through which the shaft 41 extends. A head 74 on the upper end of the shaft 41 rests upon, and slidably engages, the apertured portion 75 to provide for the support for the shaft 41 and revolvable vane member 39. The shafts 41 rotate in the apertured portions 75 of the several brackets upon the revolving of the vane members 39 by the force of the air blast through the wind box. The friction of the shaft 41 in the apertured portion 75 and the friction of the head 74 on the top of the apertured portion 75 tends to retard the rotation of the shaft 41 and the revolving of the vane member 42. In locations of the wind box where the force of the air blast is proportionately excessive the excessive force against the vane members at such locations causes the head 74 on the shaft of the vane member subjected to such excessive force to bear down to a greater degree against the apertured portion 75 upon which it is supported. There is, therefore, a greater degree of friction and consequent retarding action offered by revolvable vane members at locations where the force of the air blast is excessively high. By this arrangement the flow of air through the wind box is modified to be supplied to the tuyères at substantially equal velocities. A uniform flow of air at all locations around the wind box will cause all of the vane members to revolve at approximately the same speed and hence revolve in unison as the frictional retardation of each vane member will be substantially the same under uniform operating conditions. The frictional resistance to all the shafts is generally the same and is increased only when there is an excessive downward drag on the shafts. In the sub-combination omitting the connecting means between the several vane members, each vane member acts independently to modify the air flow encountered thereby rather than acting in precise unison with the other vane members by a mechanical connection whereby energy created by the revolving of one vane member is "pumped" back into the system to influence the other vane members.

It is to be noted that the apparatus of Figures 14 and 15 has also omitted the horizontal partition extending between the several conduits 39. The inclusion of a partition adds to the efficiency of the apparatus and makes it less necessary to so arrange and crowd the remaining parts to obtain the desired degree of efficiency. Nevertheless, my invention includes the sub-combination in which the horizontal partition is omitted as illustrated in Figures 14 and 15.

In Figures 16 and 17 there is illustrated another arrangement of the apparatus embodying the principles of my invention. In this arrangement the horizontal partition is omitted from the combination and the vane members are positioned in over-lapped or staggered relationship to so crowd the vane members as to substantially fill the cross-sectional area of the wind box. The vane members are alternately disposed at two different levels in the wind box to permit adjacent vane members to partially over-lay and to thus substantially fill the cross-sectional area of the wind box without adjacent vane members striking each other while revolving. The plurality of vane members thus alternately disposed one slightly above the other but at the same general level in the wind box form, in effect, a partition extending around the wind box between the inlet and the outlets of the wind box.

It is also to be noted that in the arrangement illustrated in Figures 16 and 17 the tubular conduits 39 are not included in the combination. Although the tubular conduits have considerable utility in themselves and contribute to the efficiency of the apparatus in which they are incorporated, as for example in the arrangement shown in Figures 2 and 3, they may be omitted in such arrangements as shown in Figures 16 and 17. The substantial filling of the cross-sectional area of the wind box with the over-lapping or staggered revolvable vane members diminishes the necessity for the tubular conduits around each vane member.

In the arrangement of the apparatus shown in Figures 16 and 17 there is also illustrated a feature included for manually adjusting the degree of retarding friction imposed upon each of the shafts of the revolvable members. A set-screw or threaded bolt 76 extends radially inward through the outer wall of the wind box just above each supporting bracket 73. The inner end of each set-screw or bolt 76 is threadably engaged in a threaded opening formed in the side of the apertured central portion 75 of the respective bracket 73, the end face of the bolt 76 being adapted to engage a side of the shaft 41 extending through the aperture of the bracket. Upon turning the squared end of the bolt disposed upon the outside of the wind box the bolt may be moved against, or away from, the side of the shaft 41 to impose the desired degree of friction against the rotation of the shaft 41. The friction imposed upon each of the shafts modifies the amount of retarding action created by the respective vane members to the force of the air blast. By properly adjusting each of the set screws or bolts 76 the retarding action to the air blast at different locations around the annular extent of the wind box may be adjustably proportioned. Other adjusting means for adjustably fixing the retarding action of each vane member independently of the other vane members may be used instead of the set screws or bolts 76 for the practice of the invention herein disclosed.

In Figure 18 there is shown a structure for automatically adjusting the frictional resistance to the turning of the shafts 41 in accordance with the force of the air blast encountering a particular vane member. In the form of apparatus illustrated in Figure 18, there is positioned around each of the several shafts 41 and between the heads 74 and the central portions 75 of the brackets 73 a coil spring 77. The coil spring 77 is adapted to be compressed when a downward force is exerted upon the vane member and shaft extending therefrom. The reaction of the coil spring 77 under compression induces a frictional opposition to the rotating of the head 74 on the shaft 41 relative to the central portion 75. Therefore, the greater the downward force against a particular vane member by the air blast the greater the frictional resistance set up to the revolving of the vane member and the greater the retardation of the flow of air by that vane member. As each vane member in this arrangement may revolve independently of the other vane members there is provided a retardation of the air flow in different locations in the wind box in proportion to the force of the air flow encountered by each vane member. Where the force of the air blast is excessive the retardation is proportionally greater and the modification of the total air blast is therefore such that the air blast is supplied to the tuyères at substantially equal velocities.

Figures 19 and 20 illustrate a wind box wherein only the tubular conduits 39 are mounted and wherein the revolvable vane members are omitted. As the structure of the tubular conduits 39 in the wind box possesses considerable utility in itself and is a novel arrangement having functional advantages in itself, this sub-combination is included within the scope of my invention. The vertically disposed tubular conduits aid in breaking up the tangential flow of air around the wind box and direct the air downwardly in the wind box. The flow of air is thus modified in passing through the wind box from the inlet to the outlets.

Figure 21 is a view somewhat similar to that of Figure 11 but illustrates apparatus in which the several louvers 62 are not operatively connected by the ring 65 of the form of apparatus shown in Figures 8 to 12, inclusive. Each crank arm 64 is thus independent of every other crank arm 64 in the apparatus of Figure 21. A fixed anchor 78 is secured to the side of wind box 22 at a distance from the lower end of each arm 64. A threaded bolt 80 is threadably engaged in a threaded opening extending through the arm 64 and a coil spring 79 connects the anchor 78 and the end of the bolt 80. By turning the head 81 of the bolt 80 the tension of the spring 79 relative to the arm 64 may be adjusted. A lock nut 82 provides for the locking of the bolt 80 in adjusted position. The tension of the spring 79 is such that the arm 64 is resiliently urged toward the anchor 78 and consequently the louver 62 is resiliently urged toward a closed or horizontal position. The independent adjustment which may be made for determining the resilient opposition of each louver to the air blast passing through the wind box permits an adjustment of the modification to the flow of air through the wind box. By making the proper adjustment for each of the louvers the modification of the air blast may be so balanced as to assure the supply of air to the plurality of tuyères at substantially equal velocities.

Figures 22 to 25, inclusive, illustrate a modification of the arrangement described in connection with Figures 1, 2 and 6 wherein a dynamo-electric machine was mounted upon the outer end of one of the shafts 41 and all of the other shafts 41 were mechanically connected by a ring gear or other means with the one shaft carrying the dynamo-electric machine. In the modified arrangement of Figures 22 to 25 a dynamo-electric machine 86 is mounted upon the upper end of each of the plurality of shafts 41. Therefore, each of the revolvable vane members 42 is operatively connected through a shaft 41 with a dynamo-electric machine 86 mounted on the end of the shaft. The revolution of each vane member 42 is responsive to the operation of the respective dynamo-electric machine and each dynamo-electric machine operates in accordance with the revolving of the respective vane member.

A circuit arrangement which may be utilized for electrically connecting the several dynamo-electric machines 86 in synchronous operation is illustrated in Figure 24, in which only four of the dynamo-electric machines 86 are shown for the purpose of simplicity and brevity in illustration. In this arrangement the dynamo-electric machines are not connected together mechanically but are locked together by electrical connections to operate in synchrony. An example of the manner in which such dynamo-electric machines may be synchronously inter-locked is to be found in United States Letters Patent No. 2,202,421, issued to Harrell et al. on May 28, 1940, which patent also illustrates other circuit arrangements which may also be included in my apparatus to obtain the operating characteristics desired.

A variable speed prime mover 87 such as an electric motor is operatively connected by mechanical means to one of the dynamo-electric machines 86 which becomes a transmitter. The remaining dynamo-electric machines 86 become receivers. A convenient manner of operatively connecting the prime mover 87 to the dynamo-electric machine selected as a transmitter is to extend upwardly the shaft 41 upon which the transmitter is mounted and to mount the prime mover 87 upon its extended end, as is illustrated in Figure 22.

The dynamo-electric machines 86 of the character illustrated in Figure 24 are polyphase units and each comprises a stator or primary winding 89 and a rotor or secondary winding 90. The rotor or secondary winding 90 of the dynamo-electric machine 86 acting as a transmitter is driven by the variable speed prime mover 87 through the shaft 41. Although the plurality of machines 86 are illustrated as polyphase units single phase units may also be used in the circuit. The stators or primary windings 89 of the plurality of machines 86 are arranged to be energized from a three phase alternating current source, indicated by the reference characters A, B and C, through the conductors 92, 93 and 94. A switch 91 is arranged to dis-connect the conductors 92, 93 and 94 from the source of current A, B and C. The rotors or secondary windings 90 of the machines 86 are arranged to be electrically interconnected through the plurality of conductors 95, 96 and 97.

By the arrangement shown in Figure 24 the several rotors 90 are electrically inter-locked to rotate in synchrony and the machines 86 therefore are synchronously operated machines. The respective vane members 42 carried by the shafts 41 to which the rotors are mounted likewise move in synchrony. In the event that one of the vane members is subjected to an external influence which would otherwise tend to make it revolve faster than the other vane members the excess energy imparted to such a vane member is pumped back into the system and the synchrony of the several vane members is maintained. Each of the plurality of vane members may encounter different operating conditions, such as a proportionally higher rate of flow of air at one location in the wind box or a difference in the resistance to the flow of air, which conditions would tend to disturb the equilibrium of the revolving vane members. Such dis-uniformity is eliminated by the synchronous action of the machines 86 and the flow of air through the wind box is modified by the vane members to be supplied to the tuyères in uniform amounts at substantially equal velocities.

In operation, the variable speed prime mover 87 is adjusted to the desired speed and operated to drive the transmitter machine 86 at the predetermined speed, which transmitter causes the receivers to revolve at the same speed. In the event that the rate of flow of total air blast delivered by the main blower delivering air through the wind box inlet is in excess of the rate of speed of the vane members then the excess energy imparted to the vane members and thence to the machines 86 is pumped back into the electrical system. As the prime mover 87 is designed in such proportion and size as to absorb the additional energy without appreciable speeding up, the rate of rotation of the prime mover 87 and the machines 86 will be substantially maintained at said pre-determined speed. The vane members being thus maintained at a proper rate of rotation will prevent any excess flow of air to the tuyères and maintain the total rate of flow of air to the tuyères at a uniform amount. At the same time the flow of air through the wind box is so modified as to be delivered to the plurality of tuyères at substantially equal velocities.

In the event that the main blower fails to supply a flow of air at the required minimum rate to the wind box or to a portion thereof or in the event that the main blower fails to blow air at all into the wind box, the vane members 42 being revolved at a constant pre-determined speed will act as blowers in themselves to draw air from the wind box inlet and to force the air uniformly down through the wind box to the tuyères. The vane members 42 thus maintain a constant and uniform supply of air regardless of the operating condition of the main blower and even regardless of whether a main blower is utilized. When there is an absence of a minimum supply of air air blast delivered to the wind box or to a portion thereof then the vane members 42 enter in and do the work which a main blower would otherwise perform. It is therefore seen that my invention includes the supplying of an air blast to the tuyères without the use of a main blower for delivering an air blast to the wind box. For example, my invention thus includes the arrangement of parts shown in Figures 22 and 23 in which the inlet conduit 23 is open to atmosphere rather than in communication with a blower or in which there is no inlet conduit 23 and the upper wall of the wind box is removed to open up the top of the wind box to atmosphere. In such an arrangement of parts the vane members 42 may serve multiple and selective purposes in blowing air through the wind box toward the tuyères, in maintaining a uniformly continuous supply of air at a pre-determined rate for delivery to the tuyères, and in assuring a delivery of air to the plurality of tuyères at uniform velocities.

In Figure 25 there is illustrated another electrical circuit which may be utilized in conjunction with the dynamo-electric machines 86 mounted on the shafts 41 as shown in the views of Figures 22 and 23. In the circuit arrangement of Figure 25 the dynamo-electric machines are not synchronously inter-locked as was disclosed in the case with the circuit of Figure 24. Instead, each of the dynamo-electric machines is independently adjustable to operate at variable pre-determined speeds. The armature member 100 which carries a shaft 41 and vane member 42 to rotate therewith is electrically connected by the conductors 98 and 99 with a source of electric current. Switches 101 and 102 are adapted to open and close the said electrical connection with the source of current. A conductor 105 connected to the conductor 112 is adapted to establish an electrical circuit through the adjustable resistance winding 106 and the switch 103 with the conductor 113. A governor, shown by the block 114, is responsive to the speed of rotation of the armature 100 and is connected by the mechanical linkage 115 with the mechanical connection 104 and to thus operate the switches 101, 102 and 103 in accordance with the speed of rotation of the armature 100.

The field winding 107 is electrically connected with a source of electric current through the conductors 109 and 110, the conductor 110 having a switch 111 and adjustable resistance winding 108 connected in series therewith. The mechanical connection 104, shown by broken lines, connects the switches 101, 102 and 103 in such manner that when switches 101 and 102 are closed switch 103 will be open.

It is to be recalled that in the absence of air flow equalizing means in the wind box the air flows unequally at different locations in the wind box, the flow of air being excessive at some locations around the cross-sectional area of the wind box and being deficient at other locations. For example, at one location the rate of flow may be 150% of the normal flow desired for delivery to the tuyères and at the same time at another location the rate of flow may be 50% of said normal flow. To obtain a 100% flow at both locations the revolvable vane member at the first location will be used to retard the flow of air and the revolvable vane member at the second location will be used to increase or speed up the flow of air. When retarding the flow of air the dynamo-electric machine connected to the vane member encountered will be operated as a generator upon the imparting of excessive energy thereto. When increasing or speeding up the flow of air the dynamo-electric machine connected to the vane member encountered will be operated as a motor to positively advance the air through the wind box. Likewise, the total air flow delivered to the wind box by a main blower may fall below a desired minimum or may fail entirely, in which cases the dynamo-electric machines may be operated as motors to advance the air through the wind box at the total minimum rate. If the main blower delivers an air blast at a rate in excess of the total maximum flow desired, then the dynamo-electric machines may be operated as generators to retard or reduce the excessive rate of flow.

Under one condition of operation with the field 107 excited, the switches 101 and 102 are closed with the switch 103 open to electrically drive the armature 100 as a motor, which positively rotates the vane member 42. The speed of the revolving of the armature 100 may be adjusted to the predetermined rate desired by manipulation of the adjustable field resistance winding 108. In the event that external influences (such as an excessive force of air against a particular vane member 42 or a difference in resistance encountered by the air flow) tend to cause a vane member 42 and corresponding armature 100 to revolve at a greater speed than the said desired pre-determined rate there is provided a retarding or limiting action to such an increase in speed. The mass and design of the dynamo-electric machine is such that within limits the excess energy imparted to the vane member is absorbed by the machine and the rate of speed is maintained at substantially the same pre-determined rate.

Under another operating condition the switches 101 and 102 are opened and the switch 103 is closed by the common mechanical connection 104 and the dynamo-electric machine operates as a generator. Electrical current generated by the revolving armature 100 will then flow through the circuit of conductors 112 and 105, adjustable resistance winding 106, the switch 103 and the conductor 113 back to the armature. The resistance winding 106 is adjusted to provide that the excess energy will be dissipated in the resistance winding 106 and the speed of revolution of the armature 100 thus maintained at a desired predetermined rate. The mechanical connection 104 moving the switches 101, 102 and 103 may be operated manually, by the action of the governor 114 responsive to the speed of the armature or by other means responsive to the operating conditions encountered.

Although Figure 25 shows the circuit diagram for only one of the plurality of dynamo-electric machines it is understood that the circuit is the same for each of the others. In the arrangement in which the circuit of Figure 25 is utilized each of the dynamo-electric machines is separately adjusted to the required speed. By proper adjustment the relative speed of the plurality of vane members may be brought in equilibrium and the air advanced thereby delivered to the plurality of tuyères at substantially equal velocities. As in the case of the circuit arrangement of Figure 24, the vane members 42 may serve the multiple and selective purposes of blowing air through the wind box toward the tuyères as blowers, maintaining at a pre-determined rate a uniformly continuous supply of air for delivery to the tuyères, and assuring a delivery of air to the plurality of tuyères at uniform velocities.

While the dynamo-electric machine shown has the usual shunt winding it is to be understood that there may also be utilized in the combination a compound, an under-compound or a compensating type motor designed to provide the operating characteristics desired, such as flat or plate line operating characteristics during variations in the load. Other machines such as other known variable speed motors may be utilized in the combination to obtain the required results, all of which are within the scope of my invention.

In order to equalize an uneven flow of air through the wind box and to assure the supply of air to the plurality of tuyères at equal velocities each of the dynamo-electric machines having the circuit of Figure 25 is independently adjusted to meet the requirements at each location around the cross-sectional area of the wind box. At locations where the velocity of the air blast is excessive the circuit for the vane member at such locations is adjusted to cause the vane member there to retard the excessive flow and at locations where the velocity is deficient the circuit for the vane member at such locations is adjusted to cause the vane member there to increase or speed up the flow of air. In this manner the flow of air through the wind box may be brought into equilibrium to be supplied to the tuyères at substantially equal velocities. Likewise, when the main blower fails to supply a total air blast at the required velocity or fails to operate at all or is omitted entirely, the respective machines 86 for each of the vane members having the circuits of Figure 25 are independently adjusted to cause the several vane members to blow air through the wind box at the desired rate and in the proper proportion around the cross-sectional area of the wind box. Also, when the total air blast delivered to the wind box by a main blower is at a rate in excess of that desired, the several machines having the circuits of Figure 25 are independently adjusted to provide the desired retarding action to the total air blast, the retardation being in the proper proportion around the cross-sectional area of the wind box to assure the supplying of air to the plurality of tuyères at the desired rate and at uniform velocities.

The foregoing description taken in conjunction with the drawings has pointed out some of the principal advantages and results obtainable from the use of the invention described. However, there are other advantages and results which are inherent in the structure disclosed and which are nevertheless included within the spirit and the scope of the invention. Changes and modifications may be suggested by the present disclosure but these changes and modifications so suggested from inspection of the drawings and description are considered as a part of the disclosed invention as defined in the claims hereof. Likewise, the claims hereof are a part of this specification and the description of the invention in said claims is included in the present disclosure.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a furnace having a wind box for supplying a blast of air to a plurality of tuyères, said wind box having an inlet adapted to communicate with a source of an air blast and having outlets in communication with said tuyères, a plurality of yieldable resistors positioned in said wind box intermediate of, and at a distance from, said inlet and said outlets to substantially fill the cross-sectional area of the wind box and disposed in the path of the air blast passing through the wind box, said resistors yieldably resisting said air blast to modify the velocity thereof, and means for balancing in equilibrium the modification of velocity by said resistors, the modification of velocity of the air blast by said resistors supplying the air blast to said outlets at substantially equal velocities.

2. In a furnace having a wind box for supplying a blast of air to a plurality of tuyères, said wind box having an inlet adapted to communicate with a source of an air blast and having outlets in communication with said tuyères, a plurality of yieldable resistors positioned around the annular extent of said wind box in the path of the said air blast passing through the wind box from the inlet to said outlets to divide the wind box into a portion adjacent the said inlet and another portion adjacent the said outlets, said resistors resisting said air blast and yieldably permitting the said air blast to flow from said a portion of the wind box to said another portion of the wind box, the yieldable resistance of said resistors to the air blast modifying the velocity of the air blast delivered to said outlets.

3. In a furnace having a wind box for supplying a blast of air to a plurality of tuyères, said wind box having an inlet adapted to communicate with a source of an air blast and having outlets in communication with said tuyères, a plurality of movable resisting members positioned in said wind box intermediate a portion of the wind box adjacent said inlet and another portion of the wind box adjacent said outlets to substantially fill the cross-sectional area of the wind box, yielding means connected to said resisting members for yieldably urging said resisting members to resist said blast and to permit said blast to flow through the wind box from said a portion of the wind box to said another portion of the wind box and toward the said outlets at modified velocities.

4. In a furnace having a wind box for supplying a blast of air to a plurality of tuyères, said wind box having an inlet adapted to communicate with a source of an air blast having outlets in communication with said tuyères, a plurality of movable resisting members disposed in said wind box and substantially blocking the transverse open space in the wind box to divide the wind box into a portion adjacent said inlet and a portion adjacent said outlets, yielding means connected to said resisting members for yieldably urging said resisting members to resist said blast and to permit said blast to flow through the wind box toward said outlets at modified velocities, and adjustable means for adjustably fixing the yieldability of said yielding means to adjust the modification of said air blast.

5. In a furnace having a wind box for supplying a blast of air to a plurality of tuyères, said wind box having an inlet adapted to communicate with a source of an air blast and having outlets in communication with said tuyères, the said wind box having a portion adjacent said inlet and another portion adjacent said outlets, a plurality of movable resisting members forming a partition positioned in said wind box intermediate said portion and extended around the interior of the wind box, connecting means operably connecting said resisting members to transmit movement of each resisting member to the other resisting members, and yielding means for yieldably urging said resisting members in resisting position, the yieldable resistance of said resisting members modifying the velocity of the air blast flowing through the wind box from said a portion to said another portion of the wind box to supply the air blast to said outlets at substantially equal velocities.

6. In a furnace having a wind box positioned around the body of the furnace for supplying a blast of air to a plurality of tuyères entering the furnace, said wind box having an inlet adapted to communicate with a source of an air blast and having outlets in communication with said tuyères, a partition positioned in said wind box intermediate the inlet and the outlets for resisting the flow of air through the wind box toward the outlets, said partition having movable portions adapted to yieldably resist the said air blast, the yieldability of said movable portions providing a limited resistance to said air blast to modify the velocity of the air blast delivered to said outlets.

7. In a furnace having a wind box for supplying a blast of air to a plurality of tuyères entering the furnace, said wind box having an inlet adapted to communicate with a source of an air blast and having outlets in communication with said tuyères, a partition positioned in said wind box intermediate the inlet and the outlets for resisting the flow of air through the wind box toward the outlets, said partition having movable portions adapted to yieldably resist the said air blast, connecting means operatively connecting said movable portions together to provide for simultaneous movement thereof, and adjustable means for adjusting the yieldability of said movable portions, the yieldability of said movable portions providing a limited resistance to said air blast to modify the velocity of the air blast to said outlets.

8. In a furnace having a wind box positioned around the body of the furnace for supplying a blast of air to a plurality of tuyères entering the furnace, said wind box having an inlet adapted to communicate with a source of an air blast and having outlets in communication with said tuyères, a partition positioned in said wind box intermediate the inlet and the outlets and dividing the wind box into a portion adjacent said inlet and another portion adjacent said outlets, said partition having a plurality of open spaces therein distributed at intervals around the body of the furnace, movable members positioned in said open spaces in the path of the air blast flowing through the wind box from the inlet to said outlets, said movable members being pivotally mounted in position to provide a limited resistance to said air blast and to yield to the force of said air blast, and means for synchronizing the movement of said movable members by said air blast, the yieldable resistance of said movable members modifying the velocity of said air blast delivered to said outlets.

9. In a furnace having a wind box positioned around the body of the furnace for supplying a blast of air to the entrances of a plurality of tuyères communicating with said furnace, said wind box having an inlet adapted to communicate with a source of an air blast, a partition mounted within the wind box intermediate of, and at a distance from, said inlet and said entrances dividing the wind box into adjacent portions, said partition having a plurality of open spaces therein distributed around the body of the furnace, a movable vane positioned at each of said open spaces to meet the air blast moving through the wind box through the said partition toward the said entrances, and means for yieldably urging said movable vanes into position to resist said air blast and for permitting the air blast to flow through said open spaces toward said entrances, the yieldable resistance of said movable vanes modifying the velocity of the air blast supplied to the said entrances of the tuyères, the modification of velocity around the extent of said partition being proportioned to provide for the supply of air to said plurality of tuyère entrances at substantially equal velocities.

10. In a furnace having a wind box forming a common distributing chamber for supplying blown air to the entrances of a plurality of tuyères communicating with the said furnace, said wind box having an inlet adapted to communicate with a source of said blown air, a partition mounted within said wind box intermediate of, and at a distance from, said inlet and said entrances for restricting the flow of air through the wind box from the inlet to said entrances, said partition including movable vanes adapted to be moved by said blown air, the said movable vanes providing a resistance to the flow of air through the partition and yielding to the flow of air therethrough to permit the blown air to flow at modified velocity, said movable vanes being arranged in said partition to provide a supply of blown air to said entrances of the tuyères at substantially equal velocities.

11. In a furnace having a wind box forming a common distributing chamber for supplying a blast of air to the entrances of a plurality of tuyères communicating with the said furnace, said wind box having an inlet adapted to communicate with a source of said blast of air, a partition positioned in said wind box to divide the wind box into a portion adjacent said inlet and a portion adjacent said entrances, said partition having a plurality of conduits extending therethrough and spaced at intervals around the cross-sectional area of the wind box, revolvable vanes mounted in said conduits to meet the air blast passing through the wind box from the portion adjacent the said inlet to the portion adjacent the said entrances, said vanes being revolvable by said air blast to yield thereto, the yieldable resistance of said vanes to the air blast modifying the velocity of the air blast supplied to said entrances of the tuyères.

12. In a furnace having a wind box forming a common distributing chamber for supplying a blast of air to the entrances of a plurality of tuyères communicating with said furnace, said wind box having an inlet adapted to communicate with a source of said blast of air, a partition positioned in said wind box to divide the wind box into a portion adjacent said inlet and a portion adjacent said entrances, said partition having a plurality of conduits extending therethrough and spaced at intervals around the cross-sectional area of the wind box, revolvable vanes mounted in said conduits to meet the air blast passing through the wind box from the portion adjacent the said inlet to the portion adjacent the said entrances, said vanes being revolvable by said air blast to yield thereto, and connecting means operatively connecting said vanes to synchronize the revolutions thereof, the yieldable resistance of said vanes revolving in unison modifying said air blast to supply the air blast to said entrances of the tuyères at substantially equal velocities.

13. In a furnace having a wind box forming a common distributing chamber for supplying a blast of air to the entrances of a plurality of tuyères communicating with said furnace, said wind box having an inlet adapted to communicate with a source of said blast of air, a partition positioned in said wind box to divide the wind box into a portion adjacent said inlet and a portion adjacent said entrances, said partition having a plurality of conduits extending therethrough and spaced at intervals around the cross-sectional area of the wind box, revolvable vanes mounted in said conduits to meet the air blast passing through the wind box from the portion adjacent the said inlet to the portion adjacent the said entrances, said vanes being revolvable by said air blast to yield thereto, connecting means operatively connecting said vanes to synchronize the revolutions thereof, and retarding means for retarding the revolutions of said vanes to resist said air blast, the retarded revolution in unison of said vanes substantially equalizing the velocity of the air blast supplied to the said entrances of the tuyères.

14. In a furnace having a wind box forming a common distributing chamber for supplying a blast of air to the entrances of a plurality of tuyères communicating with said furnace, said wind box having an inlet adapted to communicate with a source of said blast of air, a partition positioned in said wind box to divide the wind box into a portion adjacent said inlet and a portion adjacent said entrances, said partition having a plurality of conduits extending therethrough and spaced at intervals around the cross-sectional area of the wind box, revolvable vanes mounted in said conduits to meet the air blast passing through the wind box from the portion adjacent the said inlet to the portion adjacent the said entrances, said vanes being revolvable by said air blast to yield thereto, connecting means operatively connecting said vanes to synchronize the revolutions thereof, retarding means for retarding the revolutions of said vanes to resist said air blast, and stabilizing means for stabilizing the revolutions of said vanes, the retarded and stabilized revolution in unison of said vanes substantially equalizing and stabilizing the velocity of the air blast supplied to the said entrances of the tuyères.

15. In a furnace having a wind box forming a common distributing chamber for supplying a blast of air to the entrances of a plurality of tuyères communicating with said furnace, said wind box having an inlet adapted to communicate with a source of said blast of air, a partition positioned in said wind box to divide the wind box into a portion adjacent said inlet and a portion adjacent said entrances, said partition having a plurality of conduits extending therethrough and spaced at intervals around the cross-sectional area of the wind box, revolvable vanes mounted in said conduits to meet the air blast passing through the wind box from the portion adjacent the said inlet to the portion adjacent the said entrances, said vanes being revolvable by said air blast to yield thereto, connecting means operatively connecting said vanes to synchronize the revolutions thereof, a dynamo electric machine operatively connected to said connecting means, and means for operating the said machine to give a stabilizing and retarding action to the revolutions of said vanes, the retarded and stabilized revolution in unison of said vanes substantially equalizing and stabilizing the velocity of the air blast supplied to the said entrances of the tuyères.

16. In a furnace having a wind box for supplying a blast of air to a plurality of tuyères, said wind box having an inlet adapted to communicate with a source of an air blast and having outlets in communication with said tuyères, a plate positioned within, and extended around the cross-sectional area of, the wind box for restricting the flow of air passing through the wind box from the inlet to said outlets, said plate being positioned at a distance from said outlets to avoid constriction of said air blast entering said outlets, said plate having a plurality of tubes extending therethrough to provide communication between the portion of the wind box adjacent the inlet and the portion of the wind box adjacent the outlets, said tubes being substantially uniformly distributed in said plate, a plurality of over-lapping vanes mounted upon rotatable shafts and positioned within each of said tubes, the said vanes being revolvable by said air blast to rotate said shafts, and means operatively connecting said shafts to provide for rotation thereof in unison, the air blast meeting and revolving said vanes being modified to be supplied at substantially equal velocities to said outlets.

17. In a furnace having a wind box for supplying a blast of air to a plurality of tuyères, said wind box having an inlet adapted to communicate with a source of an air blast and having outlets in communication with said tuyères, a partition mounted within the wind box to divide the wind box into a portion adjacent said inlet and a portion adjacent said outlets, said partition having pivotally mounted segmental portions adapted to be moved by said air blast out of the plane of said partition to permit the air blast to flow therethrough, said segmental portions being substantially uniformly distributed around the extent of said partition, means for urging said segmental portions into the plane of said partition to provide resistance to the flow of the air blast through the said partition, and means for co-ordinating the said urging means to control the resistance to the flow of air around the extent of said partition, the movement of the segmental portions by the air blast and the resistance of the segmental portions to the air blast modifying the air blast flowing through the wind box to supply the air blast at substantially equal velocities to said outlets.

18. In a furnace having a wind box for supplying a blast of air to a plurality of tuyères, said wind box having an inlet adapted to communicate with a source of an air blast and having outlets in communication with said tuyères, a partition positioned in said wind box to divide the wind box into a portion adjacent the inlet and a portion adjacent the outlets, said partition including a plurality of louvers adapted to open to permit the air blast to flow through the said partition, and means for correlating the opening by said louvers, the said louvers being distributed in said partition and movable in relationship to each other to substantially equalize the flow of the air blast throughout the cross-sectional area of the wind box at the partition, and means for yieldably urging said louvers toward closing position to resist said air blast, the opening of the louvers in yieldable resistance to the air blast supplying the air blast at substantially equal velocities to said outlets.

19. In a furnace having a wind box positioned around the body of the furnace for supplying air to a plurality of tuyères entering the furnace, said wind box having an inlet adapted to communicate with a source of an air blast and having outlets in communication with said tuyères, the arrangement of the wind box, inlet, and outlets being such that currents of air of unequal velocities circulate and move through the wind box, a partition positioned in said wind box to divide the wind box into a portion adjacent the inlet and a portion adjacent the outlets, said partition including a plurality of pivotally mounted louvers adapted to open to permit the air blast to flow through the said partition, said louvers having angularly disposed portions extending into the portion of the wind box adjacent said inlet, the disposition of said louvers and angularly disposed portions being such that the air blast moving substantially parallel to the partition urges said louvers closed and the air blast moving substantially perpendicular to said partition urges said louvers open, the said louvers being uniformly spaced in said partition around the extent of the wind box and being connected to move in unison and in equal degrees of closing, the said air blast being modified by the louvers in said partition to flow at substantially equal velocities to said outlets.

20. In a furnace having a common chamber for supplying air to a plurality of furnace tuyères, said chamber having outlets in communication with the respective tuyères, said chamber having a plurality of intake ports positioned in a plane at a distance from, and substantially parallel to, a plane passing through said outlets, said ports being substantially uniformly distributed around the extent of said chamber, a revolvable vane member mounted in each of said ports to control the passing of air therethrough, means for correlating the revolving of said vane members, and dynamo-electric means operatively connected to said vane members, the revolving of said vane members being responsive to the operation of said dynamo-electric means, air entering said chamber ports being supplied to said outlets at correlated velocities determined by the revolving of said vane members.

21. Air supply apparatus for a furnace having a plurality of tuyères to be supplied with air comprising a common distributing chamber having outlets communicating with the respective tuyères, said chamber having an open portion in communication with an air source at a distance from said outlets, a plurality of revolvable vane members positioned in said open portion to control the flow of air between said air source and said chamber, said vane members being distributed at intervals around the cross-sectional area of said open portion of the chamber, connecting means operatively connecting said vane members to provide for synchronous revolving thereof and the uniform control of air flow, and dynamo-electric means operatively connected to said vane members, the said vane members revolving in accordance with the operation of said dynamo-electric means, air entering said chamber under the uniform control of said revolvable vane members being supplied by said chamber at substantially uniform velocities to said outlets.

22. In a furnace having a wind box for supplying a blast of air to a plurality of tuyères, said wind box having an inlet adapted to communicate with a source of an air blast and having outlets in communication with said tuyères, a plurality of movable yieldable resistors positioned in said wind box intermediate the inlet and the outlets and substantially filling the cross-sectional open area within said wind box, the yielding of each of said resistors being dependent upon the force of the air blast encountering each resistor, said resistors resisting said air blast and yieldably permitting the air blast to flow through the wind box to said outlets, the air blast being substantially averaged in force around said cross-sectional area of the wind box by said yieldable resistance to be supplied to the outlets at substantially equal velocities.

23. In a furnace having a wind box for supplying a blast of air to a plurality of tuyères, said wind box having an inlet adapted to communicate with a source of an air blast and having outlets in communication with said tuyères, a plurality of movable resistors positioned in said wind box and substantially occupying the cross-sectional area of the wind box to resist the flow of air from the inlet to the outlets, and friction means cooperating with said resistors to yieldably oppose movement of said resistors by the said air blast, the yieldable resistance of said resistors to the air blast modifying the velocity thereof to be supplied to said outlets at substantially equal velocities.

24. In a furnace having a wind box for supplying a blast of air to a plurality of tuyères, said wind box having an inlet adapted to communicate with a source of an air blast and having outlets in communication with said tuyères, a plurality of movable resistors positioned in said wind box and substantially occupying the cross-sectional area of the wind box to resist the flow of air from the inlet to the outlets, and opposing means opposing the force of the air blast against each of said resistors and retarding the movement of said each resistor in proportion to the force of the air blast encountering the resistor, the yieldable resistance of the air blast by the resistors controlled by said opposing means providing for the supply of the air blast to said outlets at substantially equal velocities.

25. In a furnace having a wind box for supplying a blast of air to a plurality of tuyères, said wind box having an inlet adapted to communicate with a source of an air blast and having outlets in communication with said tuyères, a plurality of movable resistors positioned in said wind box and substantially occupying the cross-sectional area of the wind box to resist the flow of air from the inlet to the outlets, retarding means for retarding the movement of each of said resistors, and adjusting means for independently adjusting the retardation of each of said resistors, the retarded resistance of said air blast by the resistors as adjusted for each of said resistors providing for the modification of the air blast encountered by the plurality of resistors to be supplied to the plurality of outlets at substantially equal velocities.

26. In a furnace having a wind box surrounding the body of the furnace for supplying a blast of air to a plurality of tuyères entering the furnace, the wind box having an inlet adapted to communicate with a source of blown air and having outlets in communication with said tuyères, the arrangement of the wind box and the positions of the inlet and outlets being such that air entering the wind box circulates in currents around the interior of the wind box tangentially of the furnace toward the outlets, a plurality of tubular conduits arranged longitudinally of, and within, the wind box intermediate of, and at a distance from, said inlet and said outlets, said tubular conduits having open ends and substantially filling the cross-sectional area of the wind box, the air blast moving through the wind box and encountering the walls of said tubular conduits being directed longitudinally of the wind box toward the outlets substantially free from tangential currents.

27. In a furnace having a common distributing chamber for supplying air to a plurality of furnace tuyères, a plurality of revolvable vane members positioned in said chamber at a distance from the entrances to said tuyères and substantially filling the cross-sectional area of the chamber, said vane members being arranged to control the movement of air at said cross-sectional area of the chamber, dynamo-electric means operatively connected to said vane members, the revolving of said vane members and the operation of said dynamo-electric means being mutually responsive, means for correlating the revolving of the said vane members, and adjustable electrical circuit means arranged to control the operation of said dynamo-electric means, the said vane members being revolvable in accord with said dynamo-electric means to pass air through the said chamber at the required rate to said tuyères and at uniform velocities.

28. Air supply apparatus for a furnace having a plurality of tuyères to be supplied with air comprising a common distributing chamber having outlets communicating with the respective tuyères, said chamber having an open portion in communication with an air source at a distance from said outlets, a plurality of revolvable vane members positioned at said open portion to control the flow of air between said air source and said chamber, said vane members being substantially uniformly distributed around the cross-sectional area of said open portion of the chamber, electric motor means for driving said vane members to force air from said air source through said chamber to the said outlets, and means for correlating the revolving of said vane members to supply the air to said plurality of outlets at substantially equal velocities.

29. Air supply apparatus for a furnace having a plurality of tuyères to be supplied with air comprising a common distributing chamber having outlets communicating with the respective tuyères, said chamber having an open portion in communication with an air source at a distance from said outlets, a plurality of revolvable vane members positioned at said open portion to control the flow of air between said air source and said chamber, said vane members being substantially uniformly distributed around the cross-sectional area of said open portion of the chamber, electric motor means for driving said vane members to force air from said air source through said chamber to the said outlets, adjusting means for controlling the revolving speed of said vane members to provide for the supply of air to the said outlets at the required rate, and means for correlating the revolving of said vane members to supply the air to said plurality of outlets at substantially equal velocities.

30. In an air supply apparatus for a furnace having a common distributing chamber for supplying air to a plurality of tuyères communicating with the chamber, said chamber having an open area disposed in a plane disposed transversely of said furnace and at a distance from said tuyères, said open area being in communication with a source of air, a plurality of movable vane members positioned in, and substantially filling, said open area, dynamo-electric machines connected to each of said movable vane members, respectively, and operable therewith, the vane members being arranged to control the movement of air through said open area into said chamber in accordance with the speed of movement thereof, electrical inter-locking means for synchronizing operation of said dynamo-electric machines, and electrical circuit means for selectively operating said dynamo-electric machines as motors and as generators, the said dynamo-electric machines acting as motors driving said vane members to force air through said open area into the chamber to be supplied at the required rate and the dynamo-electric machines acting as generators retarding the movement of the vane members to retard the passage of air through said open area, the movement of the plurality of vane members in accordance with the operation of said dynamo-electric machines providing for the supply of air to said tuyères at the required rate and at uniform velocities.

31. Apparatus for supplying air to a plurality of furnace tuyères comprising a common chamber communicating with said tuyères and in communication with a source of air, a plurality of revolvable fans adapted to advance air in accordance with the speed thereof, said fans being positioned at a distance from the entrances to said tuyères and being distributed around the cross-sectional area of the chamber to control the flow of air through the chamber at said cross-sectional area, a plurality of electric motors operatively connected to said fans, respectively, for revolving the said fans, and interlocking electrical means for synchronizing the operations of said motors, the revolving of said fans by the motors advancing air through the chamber to said plurality of tuyères at substantially uniform velocities.

32. Apparatus for supplying air to a plurality of furnace tuyères comprising a common chamber communicating with said tuyères and in communication with a source of air, a plurality of revolvable fans adapted to advance air in accordance with the speed thereof, said fans being positioned at a distance from the entrances to said tuyères and being distributed around the cross-sectional area of the chamber to control the flow of air through the chamber at said cross-sectional area, a plurality of electric motors operatively connected to said fans, respectively, for revolving the said fans, and means for adjusting the speed of each of said motors to correlate the speed of the revolving of said fans, the air advanced by the said revolving fans being supplied to the plurality of tuyères at velocities governed by the speeds of said motors.

33. Air supply apparatus for a furnace having a plurality of tuyères to be supplied with air comprising a common distributing chamber having outlets communicating with the respective tuyères, said chamber having an open portion in communication with an air source at a distance from said outlets, a plurality of movable tilted vane members positioned at said open portion to control the flow of air between said air source and said chamber, said vane members being substantially uniformly distributed around the cross-sectional area of said open portion of the chamber, dynamo-electric means operatively connected to said vane members, the movement of said vane members and the operation of said dynamo-electric means being mutually responsive, means for synchronizing the movement of said vane members, and adjustable electrical circuit means arranged to control the operation of said dynamo-electric means, the said vane members being movable in accord with said dynamo-electric means to pass air through the said chamber at the required rate to said tuyères and at uniform velocities.

HERBERT A. REECE.